(12) United States Patent
Gates et al.

(10) Patent No.: US 9,666,988 B2
(45) Date of Patent: May 30, 2017

(54) SNAP BACK COVER LOCKOUT DEVICE

(71) Applicant: Cooper Technologies Company, Houston, TX (US)

(72) Inventors: Joshua Paul Gates, Kinston, NC (US); Jonathan Alan Ray, Pikeville, NC (US); Matthew Aaron Cain, Cary, NC (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 14/827,490

(22) Filed: Aug. 17, 2015

(65) Prior Publication Data

US 2017/0054252 A1    Feb. 23, 2017

(51) Int. Cl.
*H01R 13/639* (2006.01)
*F16K 35/10* (2006.01)

(52) U.S. Cl.
CPC ......... *H01R 13/6397* (2013.01); *F16K 35/10* (2013.01)

(58) Field of Classification Search
CPC ............... Y10T 70/554; Y10T 70/5566; Y10T 70/5031; Y10T 70/5637; Y10T 70/5628; F16K 35/00; F16K 35/10
USPC ...................... 70/164, 178, 180, 209, 232 LS
See application file for complete search history.

(56) References Cited

U.S. PATENT DOCUMENTS

| | | | |
|---|---|---|---|
| 1,778,989 A * | 10/1930 | Thomas | B60K 15/0409 70/164 |
| 1,832,057 A * | 11/1931 | Stein | B60K 15/0409 70/164 |
| 3,979,933 A * | 9/1976 | Mohrhoff | B65D 55/14 70/164 |
| 4,036,396 A | 7/1977 | Kennedy et al. | |
| 5,199,286 A * | 4/1993 | Jakubas | B65D 39/08 137/454.5 |
| 5,662,364 A | 9/1997 | Reeb et al. | |
| 6,132,227 A * | 10/2000 | Boteler | H01R 13/447 439/136 |
| 6,209,365 B1 | 4/2001 | Neeley | |
| 6,692,045 B1 | 2/2004 | McCall, Jr. | |
| 6,733,053 B2 | 5/2004 | Hodge et al. | |

(Continued)

OTHER PUBLICATIONS

International Search Report and Written Opinion from Corresponding Application No. PCT/US2016/046971; Dated Nov. 17, 2016.

*Primary Examiner* — Amy Cohen Johnson
*Assistant Examiner* — Oscar C Jimenez
(74) *Attorney, Agent, or Firm* — Pearne & Gordon, LLP (57) ABSTRACT

A lockout system for a receptacle mount is provided that provides an additional locking mechanism to prevent access to a receptacle mount, which may include electrical hardware such as a switch or button. The lockout system includes a first piece comprising a first base section and at least two first arms, wherein at least one of the at least two arms comprises a locking hole for receiving a locking apparatus; and a second piece comprising a second base section and at least two second arms, wherein the at least two second arms of said second piece are affixed to the at least two first arms of said first piece, wherein the second piece rotates between at least first and second positions, and in the first position, said second base section of said second piece prevents a mount receptacle cover from being opened.

10 Claims, 11 Drawing Sheets

(56) References Cited

U.S. PATENT DOCUMENTS

| | | | |
|---|---|---|---|
| 6,851,288 B2 * | 2/2005 | Howes | B65D 55/14 |
| | | | 220/315 |
| 7,478,646 B2 | 1/2009 | Borrenpohl et al. | |
| 7,806,447 B2 * | 10/2010 | Reeb | B65F 1/1615 |
| | | | 220/315 |
| 8,210,382 B2 | 7/2012 | Gigger | |
| 8,480,139 B2 | 7/2013 | Starr et al. | |
| 8,826,706 B2 | 9/2014 | Buholzer et al. | |
| 2007/0293066 A1 | 12/2007 | Hynds et al. | |
| 2012/0243447 A1 | 9/2012 | Weissman et al. | |
| 2014/0187071 A1 | 7/2014 | Rule-Greet et al. | |
| 2014/0377970 A1 | 12/2014 | Crovetti et al. | |

* cited by examiner

SNAP BACK COVER LOCKOUT DEVICE

BACKGROUND

Electrical mount receptacles, such as Cam-Lok® receptacles, contain electrical hardware for high power cable connections. The mount receptacles can be a part of heavy duty connectors to safely carry power from generators to electrical equipment. The electrical equipment can be, but is not limited to, switch gear, selective catalytic reduction packages, and traction motors, including mud pumps, draw works, rotary tables, cement pumps, and other offshore applications. Electrical mount receptacles can have covers, such as snap back covers, for assisting in protecting the electric hardware when the hardware is not being used. The cover can be attached to the mount receptacles using a hinge system, which can contain a hinge pivot that is spring loaded such that the cover is forced into the closed position when no external forces prevent it from doing so.

In some situations, it may be desirable for the cover of a mount receptacle to be lockable, such that the cover cannot be opened at an undesired time. For example, in the event that a hazardous situation was to occur outside of the mount receptacle, it is desirable that the cover be secured in place so as to prevent the hazardous situation from reaching the electrical hardware, and potentially traveling through the electrical hardware, to cause damage. In addition to preventing a hazardous situation from spreading, a secured cover may also prevent unauthorized access to the interior of the mount receptacle, such as the electrical hardware that may be contained therein. In addition, locking a cover is desirable to prevent access to live electrical equipment, such as receptacle contacts, to prevent accidental electrical shock.

SUMMARY

Disclosed herein are devices and methods for securing a cover of a mount receptacle in place to prevent the cover from opening at an undesired time. The devices include means for blocking the cover in such a way that it cannot be opened. The devices can include locking holes, suitable for receiving a locking device, such as a padlock which serves to lock the devices in place in order to prevent the cover from being opened.

More specifically, a lockout system for a mount receptacle is provided which includes, but is not limited to, a first piece comprising a first base section and at least two first arms, wherein at least one of the at least two arms comprises a locking hole for receiving a locking apparatus; and a second piece comprising a second base section and at least two second arms, wherein the at least two second arms of said second piece are affixed to the at least two first arms of said first piece, wherein the second piece rotates between at least first and second positions, and in the first position, said second base section of said second piece prevents a mount receptacle cover from being opened, and in the second position said second base section of said second piece permits the mount receptacle cover to be opened.

In addition, a lockout system for mount receptacles is provided which includes, but is not limited to, at least a first locking device and a second locking device positioned in series, each of the first locking device and the second locking device comprising: a first piece comprising a first base section and at least two first arms; and a second piece comprising a second base section and at least two second arms, wherein the at least two second arms of the second piece are affixed to the at least two first arms of the first piece, wherein the second piece rotates between at least first and second positions, whereby in the first position, the second base section of the second piece prevents a mount receptacle cover from being opened, and in the second position said second base section of said second piece permits the mount receptacle cover to be opened, and wherein the at least two first arms of the first piece comprises a hole; and a rod comprising at least a first hole near at least a first terminal end of the rod, wherein the rod removeably slides through the locking holes of the first and second locking devices to prevent said second piece from being rotated out of the first position.

DETAILED DESCRIPTION

Figure 1:
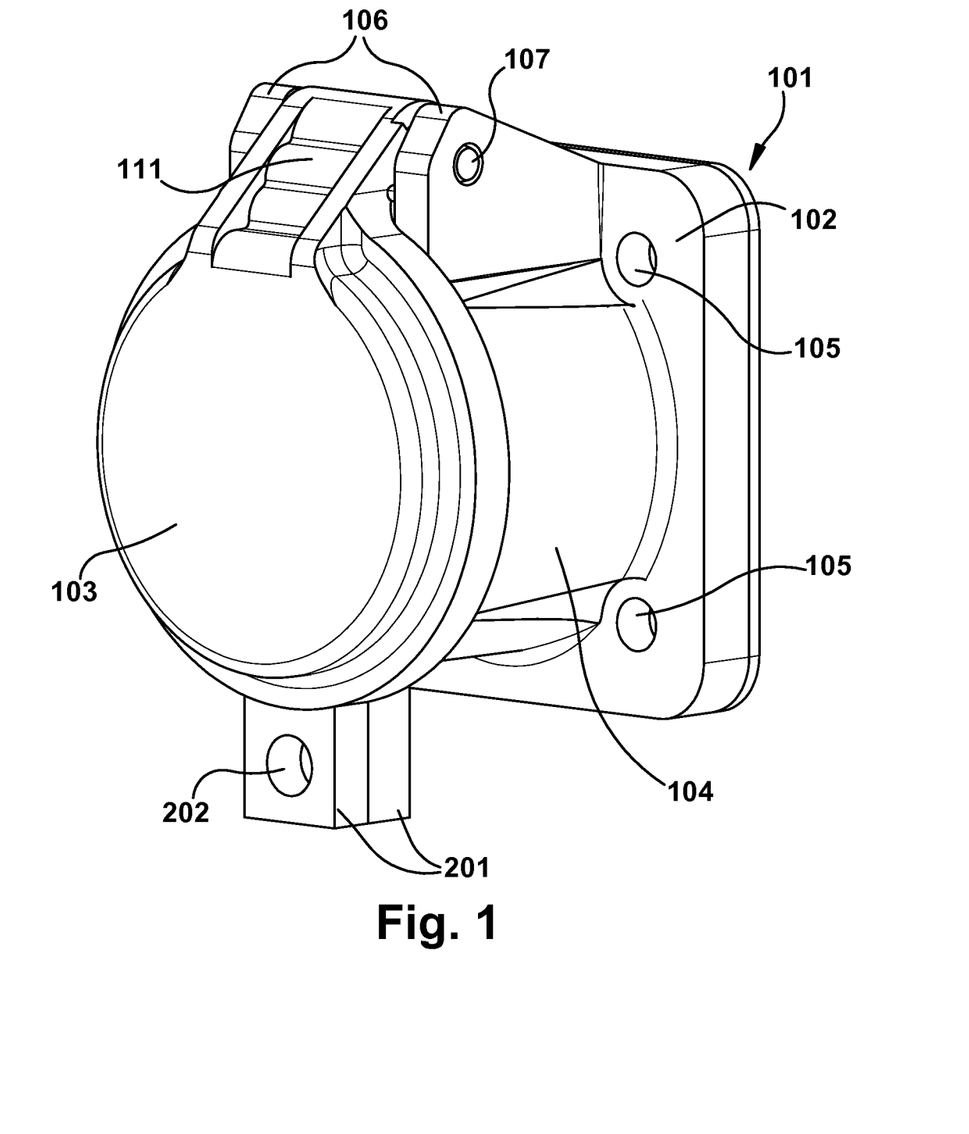
FIG. 1 is a perspective view of an example lockout device.
Figure 2A:
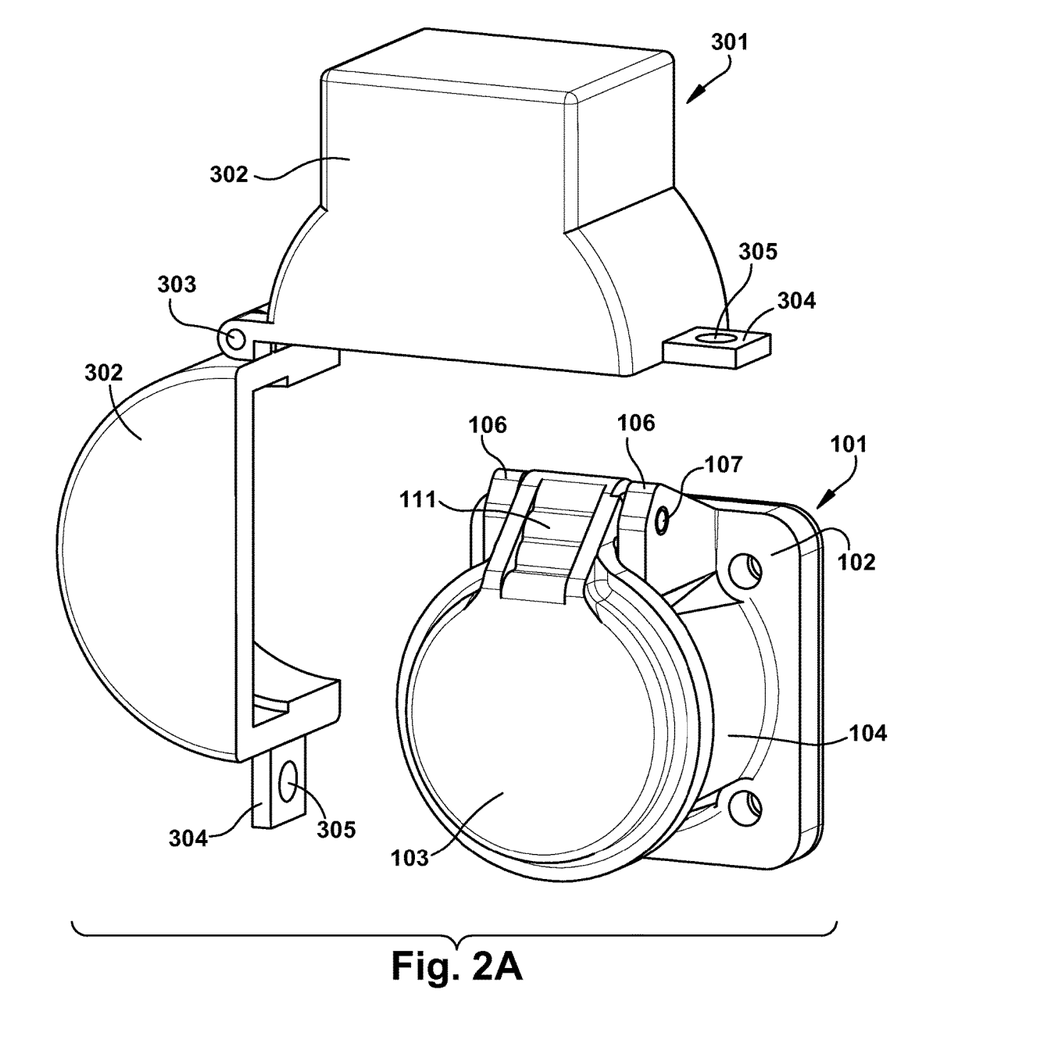
FIG. 2A is a perspective view of a clam shell lockout device.
Figure 2B:
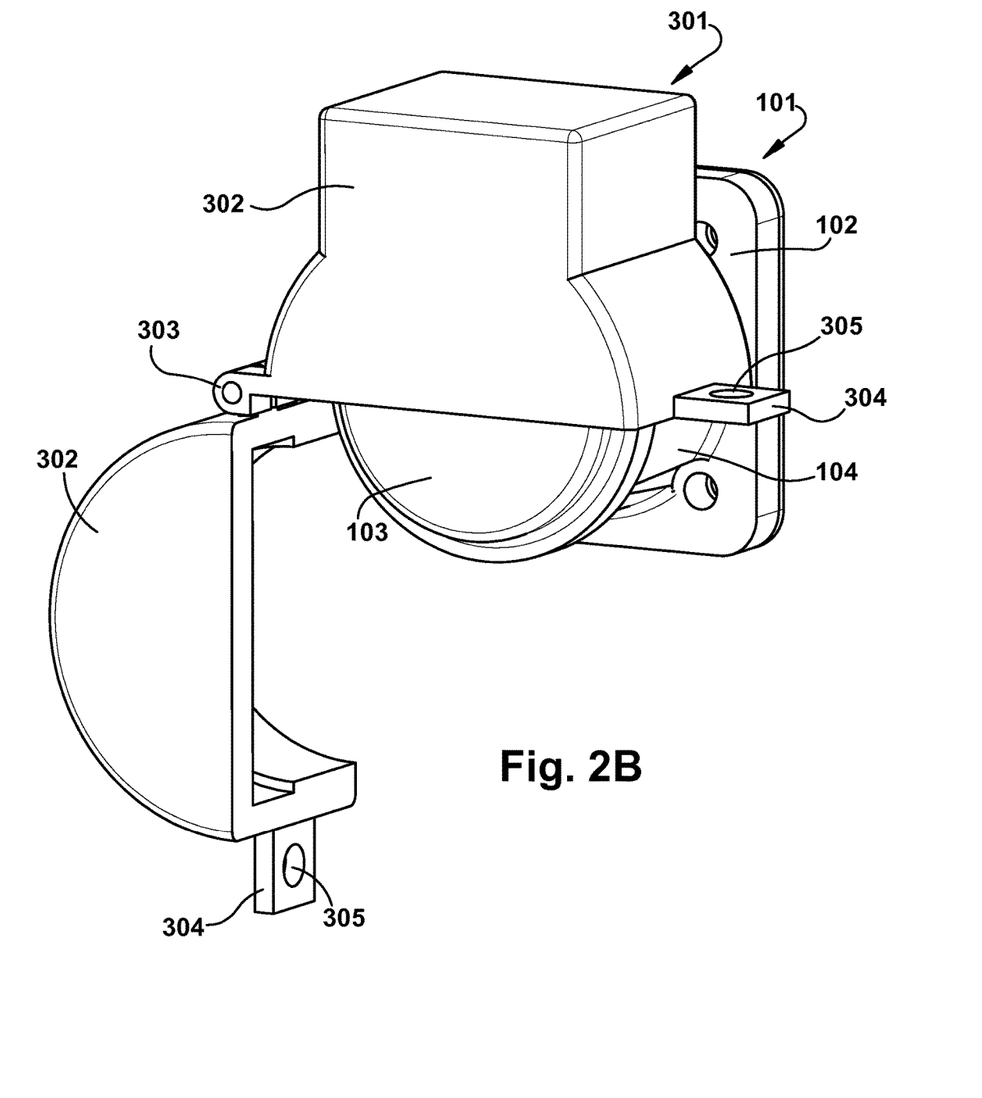
FIG. 2B is a perspective view of a clam shell lockout device at least partially installed.
Figure 2C:
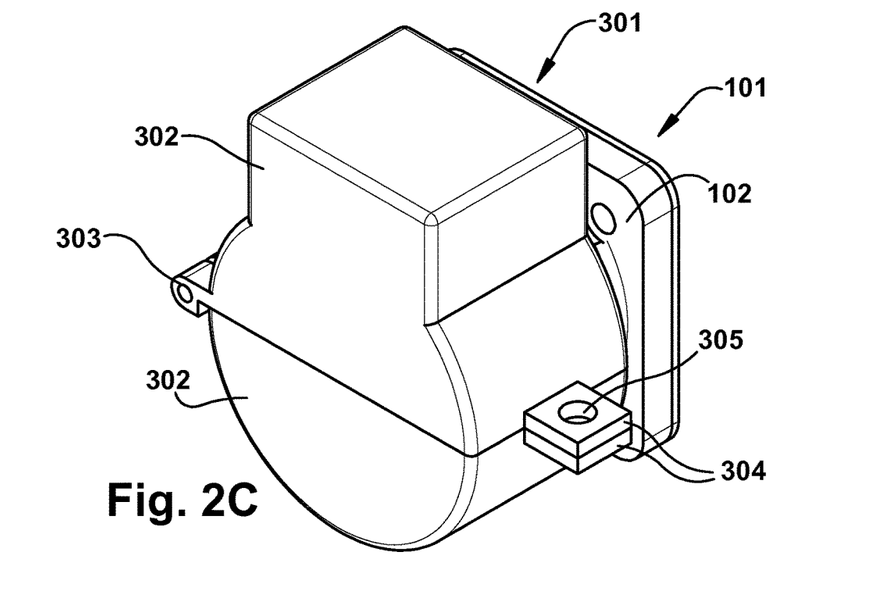
FIG. 2C is a perspective view of a clam shell lockout device at least partially installed.
Figure 2D:
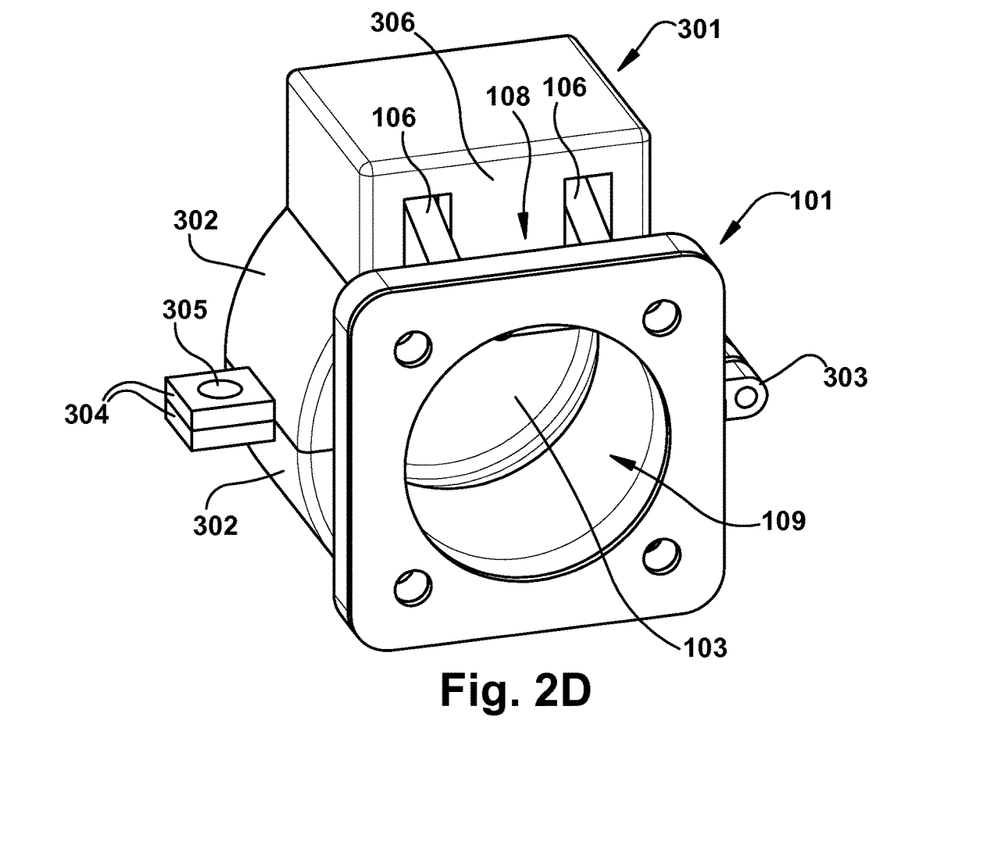
FIG. 2D is a perspective view of the back of the clam shell lockout device of FIG. 2C.

Various locking devices are described below in order to restrict access to electrical connections, switches, or other hardware from unauthorized users. FIG. 1 demonstrates one exemplary locking device. According to FIG. 1, a mount receptacle 101 is included along with a cover 103. The mount receptacle 101 includes a base section 102 and a housing section 104, which may include a type of electrical hardware. The base section 102 contains base holes 105 which can be utilized to affix the mount receptacle 101 to an object, such as a panel or other semi-permanent or permanent surface. The cover 103 is attached to the mount receptacle 101 and can pivot about a hinge system which includes hinge arms 106 and a hinge pin 107. The hinge pin 107 can be spring-loaded such that the cover 103 returns to the closed position (shown in FIG. 1) when no external forces maintain it in the open position.

In addition, cover 103 and housing section 104 of mount receptacle 101 each have a locking flange 201. Each locking flange 201 contains a locking hole 202. When the two holes are in close enough proximity to one another, a locking apparatus can engage both of the locking flanges so as to prevent the cover from being opened. Turning now to FIGS. 2A-2D, another embodiment is depicted. The locking device of FIG. 2A-2D also includes a mount receptacle 101 and a cover 103. The mount receptacle 101 includes a base section 102 and a housing section 104. The cover 103 is attached to the mount receptacle 101 and can pivot about a hinge system that includes hinge arms 106 and a hinge pin 107. The hinge pin 107 can be spring loaded such that the cover 103 returns to the closed position (shown in FIG. 2A) when no external forces maintain it in the open position. A cover arm 111 extends from the main body of the cover 103 and interacts with the hinge pin 107. The design and shape of the cover arm 111, hinge arms 106, and the mount receptacle base section 102 forms a recess 108. The interior 109 of mount receptacle 101 may include a type of electrical hardware.

The device shown in these figures includes a clam shell locking device 301 that includes two sections 302 that are rotatable with respect to one another about a hinge 303. When the device is placed around the housing section 104 of the mount receptacle 101 and the cover 103 according to FIG. 3B, the two sections 302 can be rotated toward one another to enclose the mount receptacle and cover (see FIG. 2C). The clam shell locking device 301 includes locking flanges 304, and each locking flange 304 contains a locking hole 305 that are aligned with one another so that a locking apparatus can engage both locking holes at once, thereby preventing the two sections 302 of the clam shell locking device from rotating. The clam shell locking device 301 also includes a recess flange 306 that engages the recess 108. The recess flange 306 aids in preventing clam shell locking device 301 from being removed from engaging the mount receptacle 101 and the cover 103 as demonstrated in FIG. 2D. Thus, when the clam shell locking device 301 is engaged around the mount receptacle 101 and the cover 103, the cover is prevented from being opened. While not shown, it should be appreciated that the locking apparatus can be a padlock.

Figures 3A, 3B:
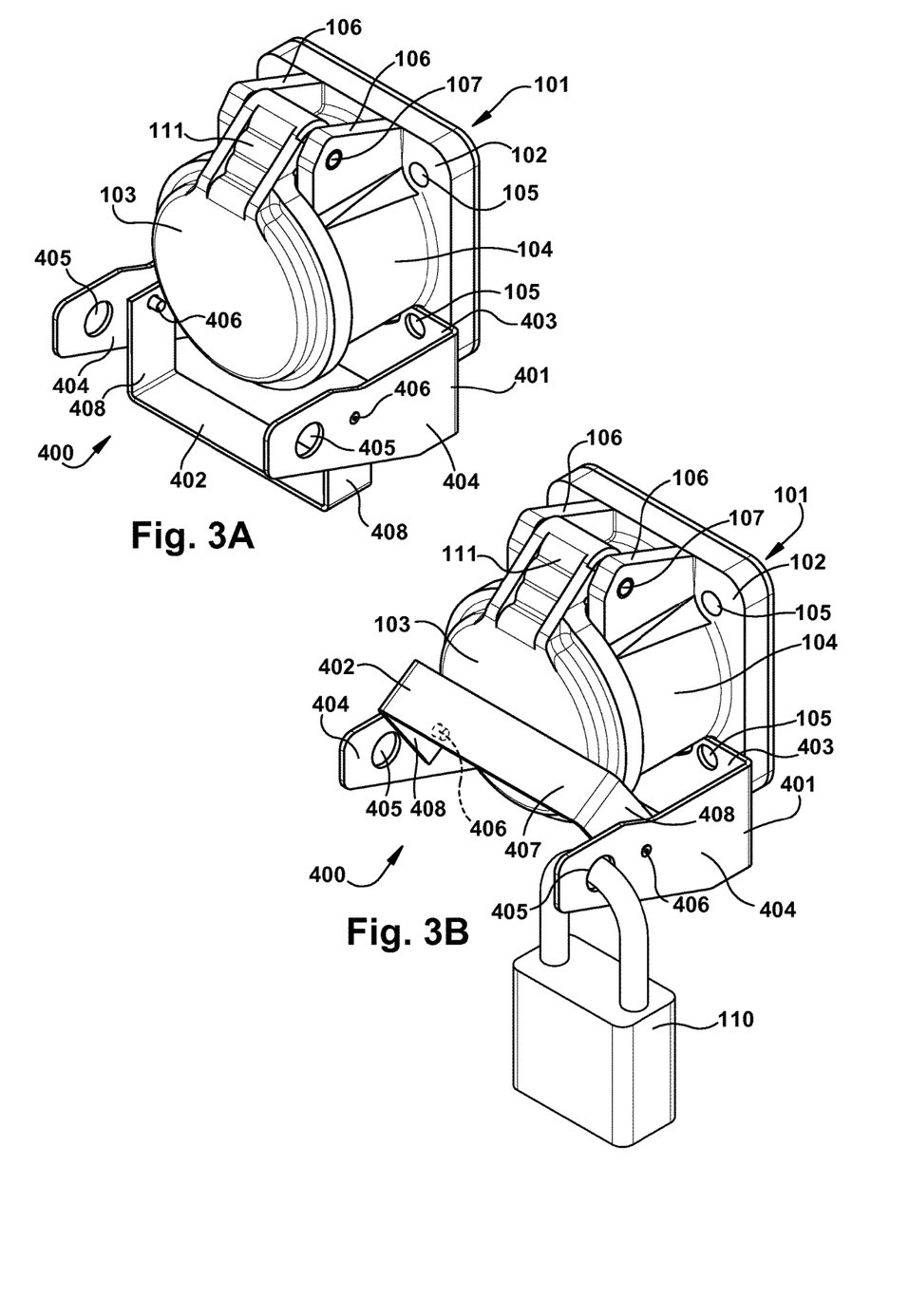
FIG. 3A is a perspective view of another aspect of a lockout device.
FIG. 3B is a perspective view of the lockout device of FIG. 3A in a closed position.

In yet another embodiment of the present disclosure, as shown in FIGS. 3A-3B, a mount receptacle 101 and a cover 103 are included. Similar to the description of FIG. 2A, the mount receptacle 101 includes a base section 102 and a housing section 104. The cover 103 is attached to the mount receptacle 101 and can pivot by way of a hinge system that includes hinge arms 106 and a hinge pin 107. The hinge pin 107 can be spring loaded such that the cover 103 returns to the closed position (shown in FIG. 3A) when no external forces are holding it in the open position. A cover arm 111 extends from the main body of cover 103 and interacts with the hinge pin 107. The base section 102 of mount receptacle 101 contains base holes 105 which can be utilized to affix the mount receptacle to an object or hard surface.

In this embodiment, the locking device 400 includes two bent pieces 401 and 402 that together serve as the locking means to prevent the cover 103 from being opened. Both bent pieces (401 and 402) include a base section (403 and 407, respectively) and two arms (404 and 408, respectively) that extend perpendicularly in the same direction away from the base sections. The base section 403 of the first piece 401 has holes corresponding to base holes 105 of the mount receptacle base section 102 such that the first piece can be fastened to the mount receptacle base section. The arms 408 of the second piece 402 are secured to the arms 404 of the first piece 401 via hinges 406 such that the second piece can rotate between an open position (as seen in FIG. 3A) and a closed position (as seen in FIG. 3B). When the second piece 402 is in the closed position, the base section 407 of the second piece blocks the cover 103 such that the cover cannot be opened. The first piece 401 includes locking holes 405 positioned in a manner that when second piece 402 is in the closed position, a locking device, such as a padlock 110, can be employed through one of the locking holes to prevent the second piece from being able to be rotated out of the closed position. The first piece and the second piece may be composed of various materials having a strength sufficient to perform as described herein and not easily broken or manipulated. For example, each piece may be made of a metallic or non-metallic material.

Figure 4A:
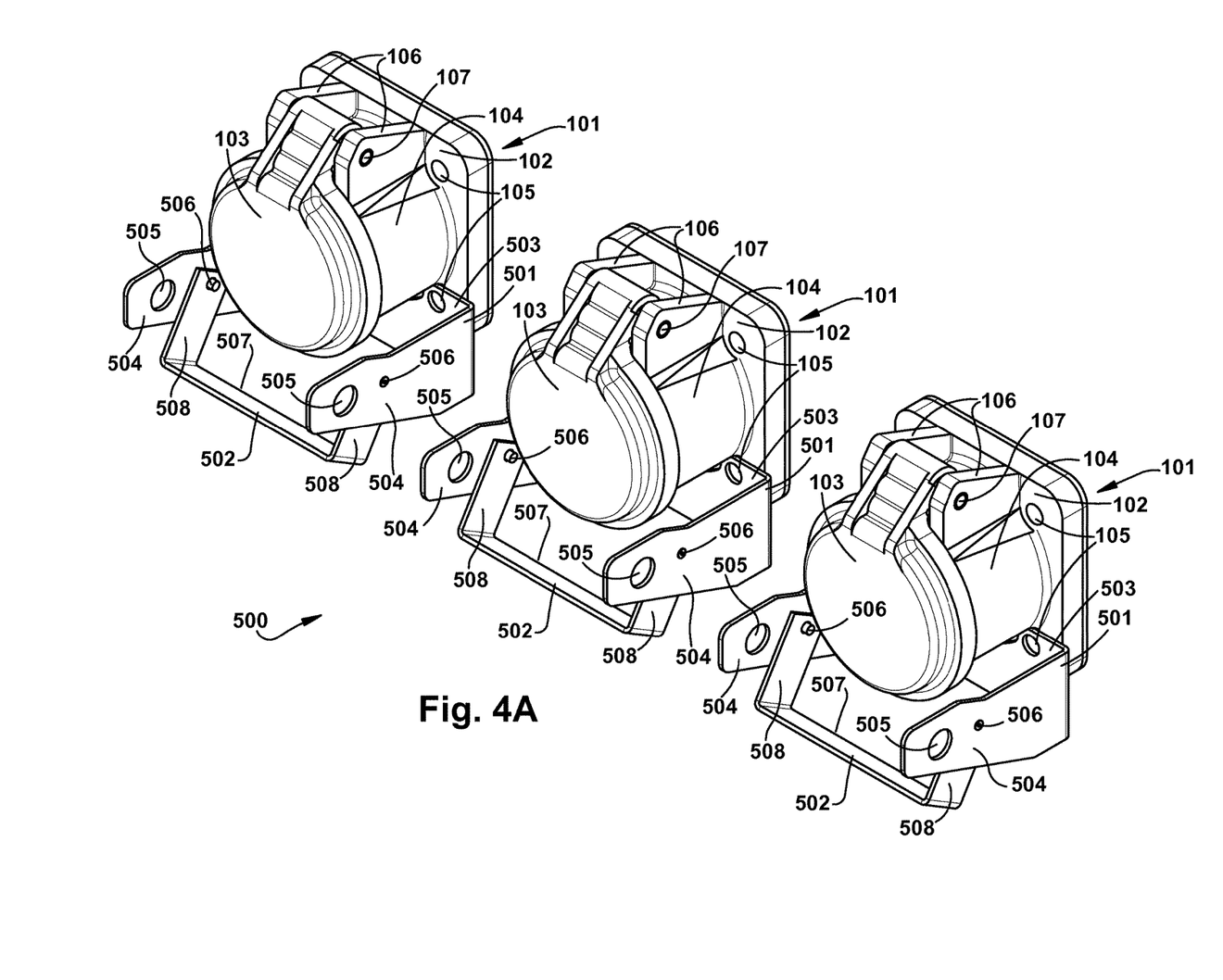
FIG. 4A is a perspective view of another aspect of a lockout device in series.
Figure 4B:
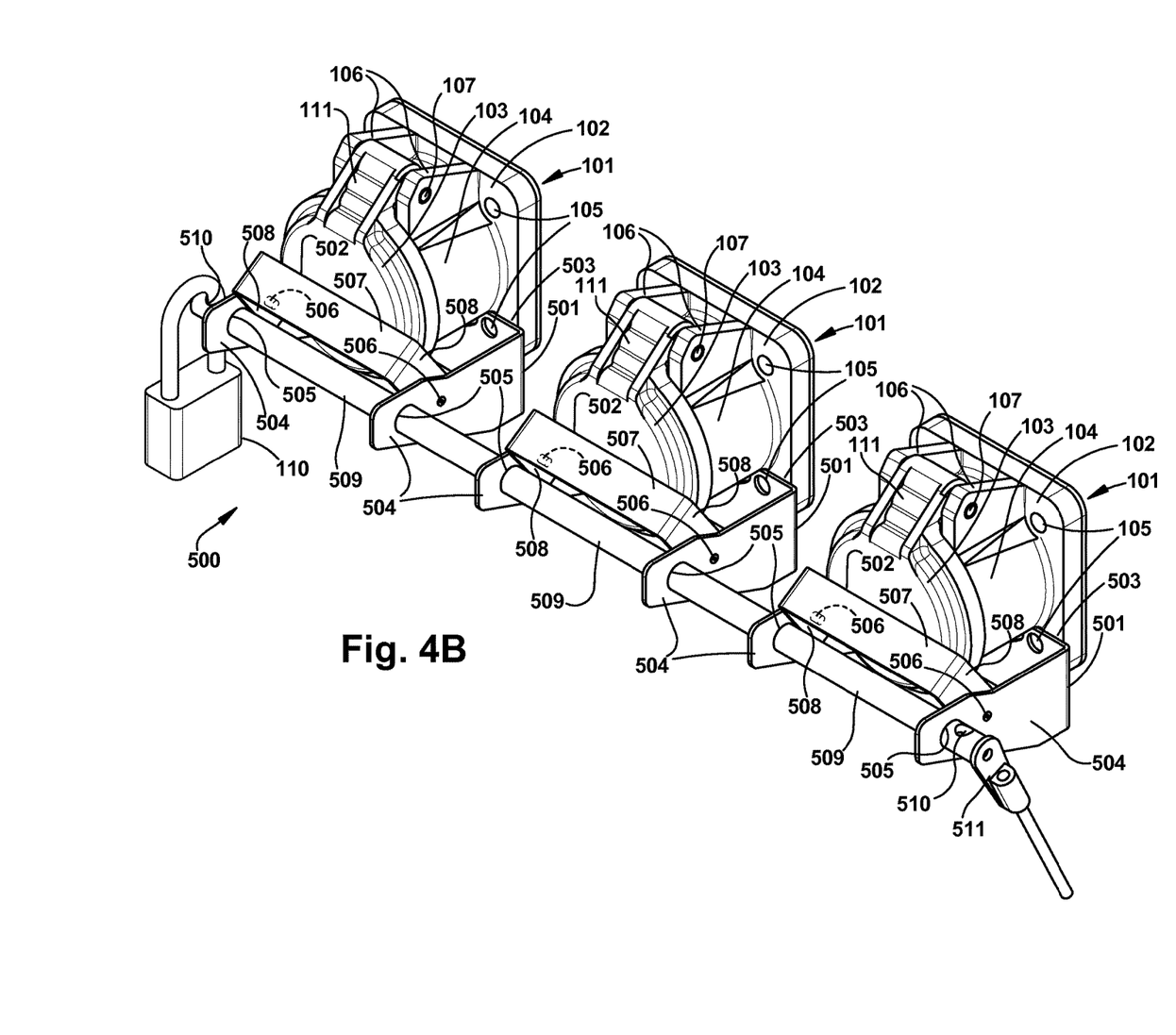
FIG. 4B is a perspective view of the lockout device of FIG. 4A in a closed position.

In still another embodiment of the present disclosure, FIGS. 4A-4B illustrate multiple mount receptacles 101 and covers 103 in series. As shown in the earlier figures, each mount receptacle 101 includes a base section 102 and a housing section 104. A cover 103 is attached to each receptacle 101 and can pivot about a hinge system that includes hinge arms 106 and a hinge pin 107. The hinge pins 107 can be spring loaded such that each of the covers 103 return to the closed position (shown in FIG. 4A) when no external forces are holding them in the open position. The base sections 102 of the mount receptacles 101 contain base holes 105 which can be utilized to affix the mount receptacles to an object or other suitable surface as desired.

The locking device 500 in the subject figures includes two bent pieces 501 and 502 per mount receptacle 101 that together serve as the locking device 500 to prevent the covers 103 from being opened. Both bent pieces (501 and 502) of each mount receptacle 101 include a base section (503 and 507, respectively) and two arms (504 and 508, respectively) that extend perpendicularly in the same direction away from each base section. The base sections 503 of the first pieces 501 have holes corresponding to the base holes 105 of the mount receptacle base sections 102 such that each first piece can be fastened to each mount receptacle base section. The arms 508 of each second piece 502 are secured to each arm 504 of each first piece 501 by way of hinges 506 such that each second piece can rotate between an open position (as seen in FIG. 4A) and a closed position (as seen in FIG. 4B). When every second piece 502 is in the closed position, every base section 507 of each second piece blocks every cover 103. Consequently, every cover 103 cannot be opened.

Each first piece 501 includes locking holes 505 which are positioned to receive a rod 509 continuously through each set of locking holes from one end of the series to the other end of the series. When each second piece 502 is in the closed position, the rod 509 can be inserted through all of the locking holes to prevent each second piece from being able rotate out of the closed position. The continuous length of the rod 509 from end to end of the series of mount receptacles restricts access to opening each cover 103. Furthermore, the rod 509 can only slide in or out of holes 505 in one direction due to the presence of an arm 511 at one end of the rod 509. Rod 509 has holes 510 at each end. At one end, arm 511 is employed to prevent that end of the rod 509 from being passed substantially through a hole 505. At an opposite end, a locking apparatus, such as a lock 110, is used to prevent the rod 509 from being removed from the holes 505 once the second pieces 502 and the covers 103 are in the closed positions. Thus, the rod 509 facilitates restricting the opening of each cover 103 of each mount receptacle 101. Although typically three to five devices would be in series, the series locking devices can be for one or more covers. It is not limited to the three covers as depicted in FIG. 4A-4B. As mentioned above, the first piece and the second piece may be composed of various materials having a strength sufficient to perform as described above. For example, the first and second pieces may be made of a metallic or non-metallic material.

Figure 5A:
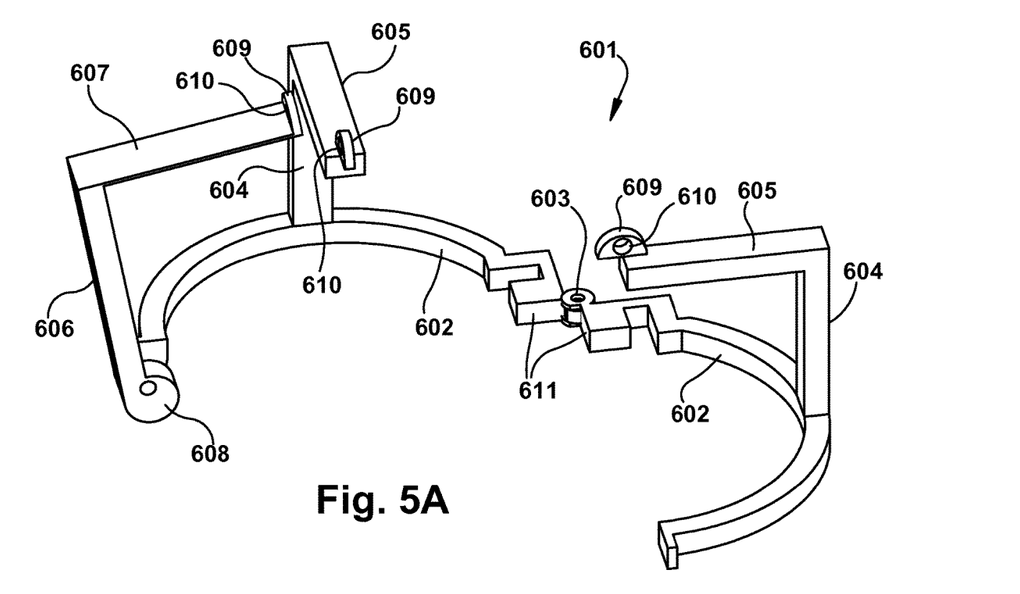
FIG. 5A is a perspective view of a cage-like locking device in an open position.
Figure 5B:
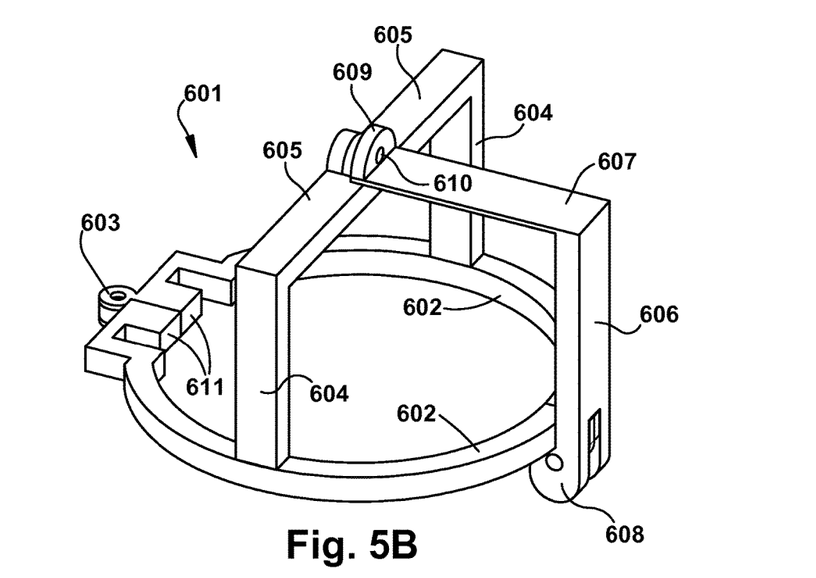
FIG. 5B is a perspective view of the cage-like locking device of FIG. 5A in a closed position.
Figure 5C:
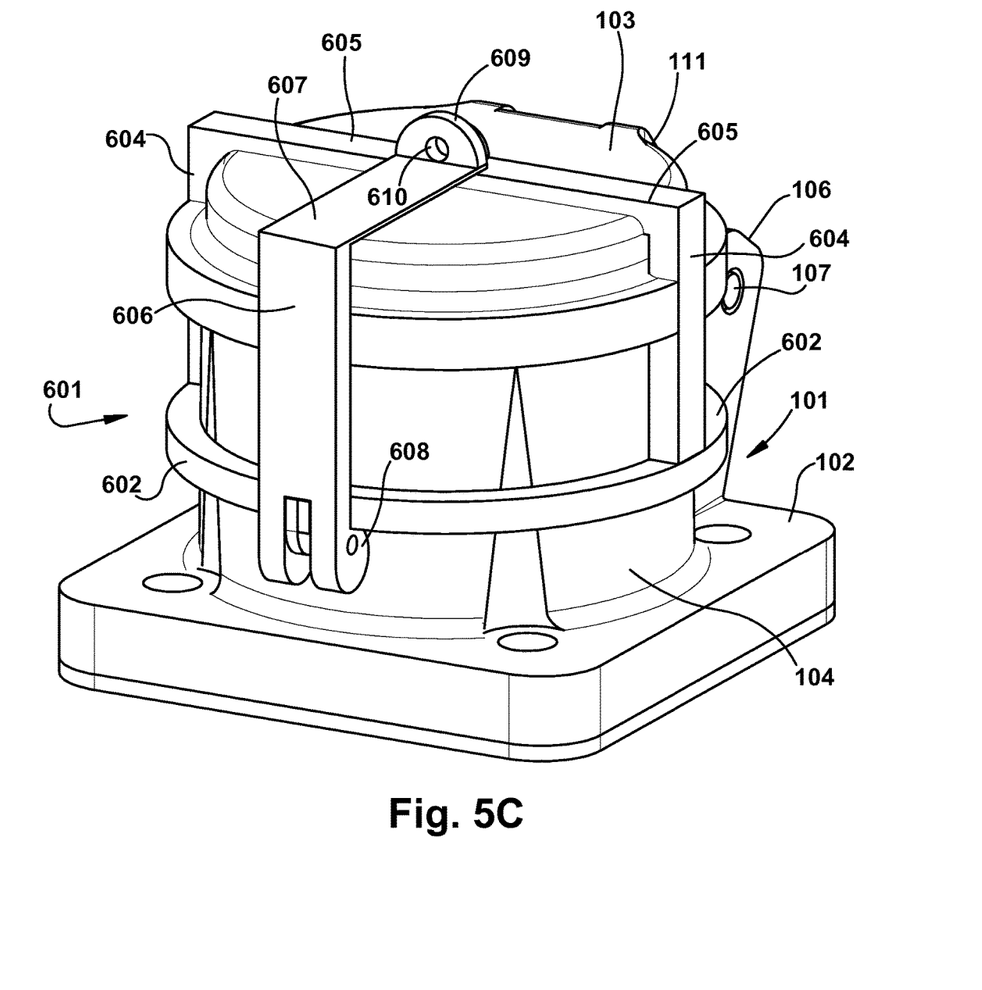
FIG. 5C is a perspective view of the cage-like locking device of FIG. 5A at least partially installed.

Another embodiment of the present disclosure is depicted in FIGS. 5A-5C. Similar to the preceding aspects, a mount receptacle 101 and a cover 103 are included, wherein the mount receptacle 101 includes a base section 102 and a housing section 104. In this embodiment, a cage-like locking device 601 partially encloses the mount receptacle 101 and the cover 103 to prevent the cover from being opened. The cage-like locking device 601 includes two base sections 602 that rotate between an open and a closed position about a hinge 603. Each section 602 has a first arm 604 that extends in a direction perpendicular to each base section 602 but parallel to one another. Each first arm 604 has a second arm 605 that extends away from the end of each first arm and generally towards one another. When the base sections 602 of the cage-like locking device 601 are in the closed position and the device is engaging the mount receptacle 101 and the cover 103, the ends of each second arm 605 are next to one another such that, together, the two second arms are in the shape of a bar (seen in FIG. 5B) that extends across the length of the cover and prevents the cover from being opened (as demonstrated in FIG. 5C).

In an opposite direction from the hinge 603, the locking device 601 includes a third arm 606. The third arm 606 extends in a direction perpendicular to base sections 602 but parallel to the first arm 604. The third arm 606 is joined to a fourth arm 607 that extends perpendicular to the third arm 606 and towards the second arm 605 (and planar with the second arm 605 when ends (609) of the arms 605, 607 meet). The third arm 606 is attached to one of the two base sections 602 via a hinge 608, such that the third arm 606 can rotate from the perpendicular position to a position parallel to the base section. Both of the base sections 602 near the hinge 603 are shaped in such a way that when placed together, they form recess flange 611 (shown in FIG. 5B) that fits within the recess 108 when assembled. The recess flange 611 aids in preventing the cage-like locking device 601 from being removed from engaging the mount receptacle 101 and the cover 103. The ends of both second arms 605 and the end of the fourth arm 607 each have a locking flange 609. Each locking flange includes a locking hole 610 that align together such that a locking apparatus can engage all three holes at the same time. When engaged and locked in this manner, the cage-like locking device 601 is unable to be opened and removed from the mount receptacle 101 and the cover 103. One example of a locking apparatus is a padlock of a suitable size to fit through and engage the locking holes 610.

Figure 6A:
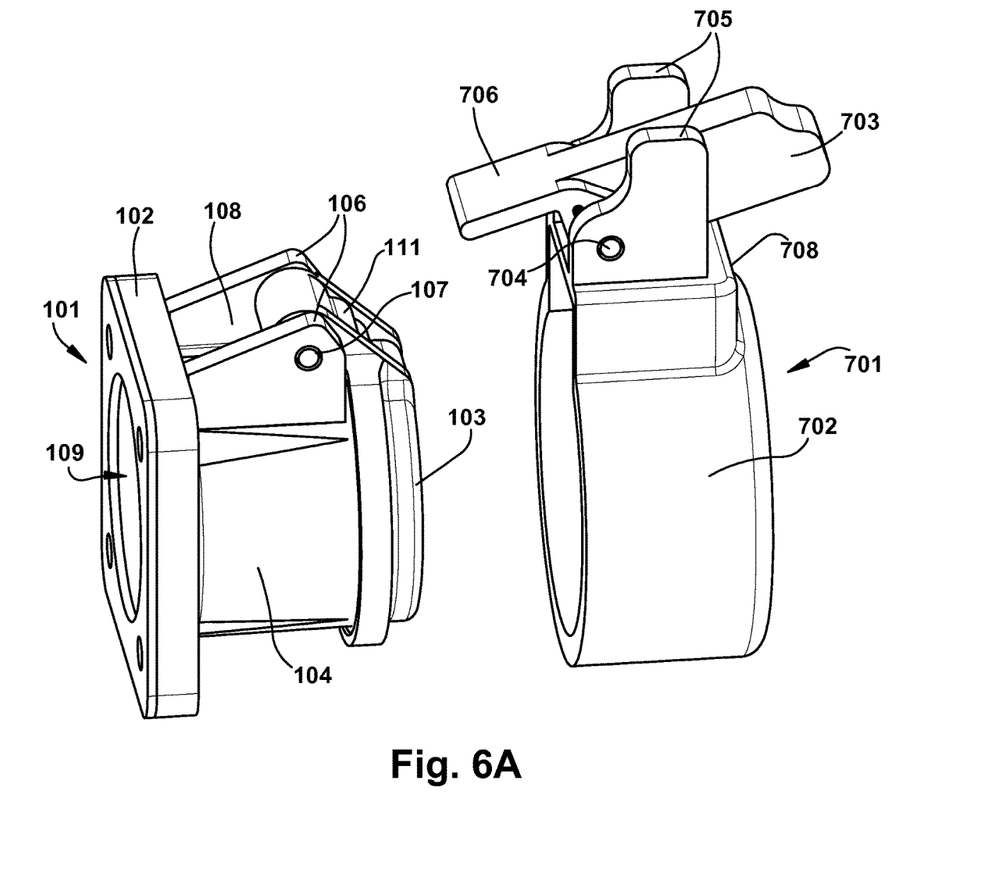
FIG. 6A is a side view of another aspect of a lockout device.
Figures 6B, 6C:
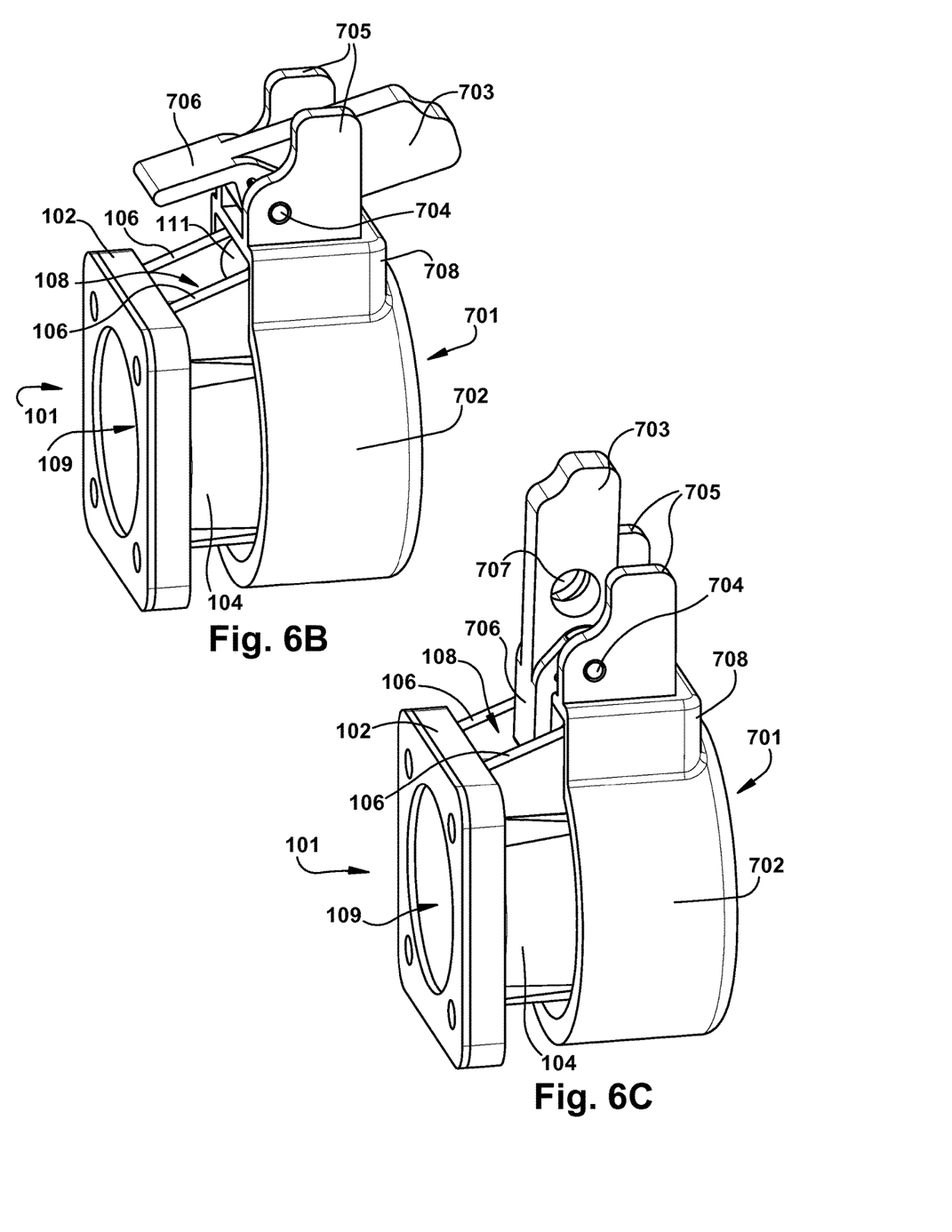
FIG. 6B is a side view of the lockout device of FIG. 6A at least partially installed.
FIG. 6C is a side view of the lockout device of FIG. 6A at least partially installed.

In yet another embodiment of the present disclosure, as shown in FIGS. 6A-6C, a lid enclosure 701 partially encloses the mount receptacle 101, particularly the housing section 104, and encloses the cover 103, thereby preventing the cover from being opened. The lid enclosure 701 comprises a main body 702 and a rectangular portion 708. The main body 702 is generally rounded which coincides with the outer shape of the cover 103. The shape of the main body 702 and the rectangular section 708 allow the lid enclosure 701 to fit over the housing section 104, the cover 103 as well as the hinge arms 106.

The lid enclosure 701 also includes a rotatable lever arm latch 703 that rotates between an unlocked position (as seen in FIGS. 6A and 6B) and a locked position (as seen in FIG. 6C) about a hinge system. The hinge system includes two lid hinge arms 705 that extend outward from the rectangular section 708 of the lid enclosure 701. The hinge system includes a hinge pin 704 that can be spring loaded such that when no external forces are being applied to the lever arm latch 703, it springs to the closed position. The lever arm latch 703 has a flange 706 that extends into the recess 108 of the mount receptacle 101 when the lever arm latch 703 is in the locked position, and thus prevents the lid enclosure 701 from being removed from the mount receptacle and the cover 103. In addition, the lever arm latch 703 includes a locking hole 707 through which a locking apparatus can be installed. When installed, the lid hinge arms 705 act as a stop and restrict or prevent the lever arm latch 703 from being rotated when the locking apparatus is installed.

The invention claimed is:

1. A lockout system for a mount receptacle comprising:
a bracket comprising a base and two arms, each of the two arms comprising an aperture;
a locking arm affixed to the two arms of the bracket, the locking arm being rotatable about an axis extending through the two arms of the bracket; and
a locking device extending through at least one of the apertures of the two arms,
wherein the bracket is mounted to the mount receptacle, the mount receptacle having a cover and a housing affixed thereto, the cover being affixed to pivot between open and closed positions, the open position providing access inside the housing,
wherein the locking device prevents rotation of the locking arm, thereby retaining the locking arm in a position that prevents the cover of the mount receptacle from pivoting to the open position.

2. The system of claim 1, wherein the bracket is affixed to the mount receptacle with a fastener inserted through the bracket and the mount receptacle.

3. The system of claim 1, wherein the locking device is a rod inserted through the apertures in the two arms, the rod comprising:
a locking apparatus inserted through a hole in the rod, thereby preventing the rod from sliding through the apertures of the two arms in a first direction; and
a flange preventing the rod from sliding through the apertures of the two arms of each of the first and second locking devices in a second direction.

4. The system of claim 3, wherein said locking apparatus is a padlock or cable.

5. The system of claim 1, wherein the cover is biased to the closed position.

6. A lockout system for mount receptacles comprising:
a first locking device and a second locking device positioned in series, each of the first locking device and the second locking device comprising:
a bracket comprising a base and two arms, each of the two arms comprising an aperture; and
a locking arm affixed to the two first arms of the bracket, the locking arm being rotatable about an axis extending through the two arms of the bracket, and
a rod extending through the apertures of the two arms of each of the first and second locking devices,
wherein the first locking device and second locking device are mounted to respective mount receptacles having a cover and a housing affixed thereto, the cover being affixed to pivot between open and closed positions, the open position providing access inside the housing,
wherein the rod prevents rotation of the locking arms of the first and second locking devices, thereby retaining the locking arms in a position that prevents the cover of each mount receptacle from pivoting to the open position.

7. The system of claim 6, further comprising a locking apparatus inserted through a hole in the rod thereby preventing the rod from sliding through the apertures of the two arms of each of the first and second locking devices in a first direction.

8. The system of claim 7, wherein said locking apparatus comprises a padlock or cable.

9. The system of claim 6, wherein the rod further comprises a flange that prevents the rod from sliding through the apertures of the two arms of each of the first and second locking devices in a second direction.

10. The system of claim 6, wherein the brackets of the first and second locking devices are affixed to respective mount receptacles by a fastener inserted through the bracket and corresponding mount receptacle.

\* \* \* \* \*